United States Patent [19]
Dexter

[11] 3,721,704

[45] March 20, 1973

[54] ESTERS OF (DIALKYL-4-HYDROXY-PHENYL)MALONIC ACID AND RELATED COMPOUNDS

[75] Inventor: Martin Dexter, Briarcliff Manor, N.Y.

[73] Assignee: Geigy Chemical Corporation, Ardsley, N.Y.

[22] Filed: Feb. 17, 1967

[21] Appl. No.: 616,801

[52] U.S. Cl. ...................260/473 S, 44/70, 99/163, 252/404, 260/45.85, 260/465 D, 260/520, 260/521 R, 260/590, 260/666.5, 260/810

[51] Int. Cl. .................................................C07c 69/76

[58] Field of Search ........260/473, 520, 465 F, 473 S

[56] References Cited

UNITED STATES PATENTS 3,013,069  12/1961  Wilkinson et al.....................260/473

2,297,911  10/1942  Niedevl...............................260/473

FOREIGN PATENTS OR APPLICATIONS 741,356  8/1966  Canada...........................260/465 F

*Primary Examiner*—Henry R. Jiles
*Assistant Examiner*—John F. Terapane
*Attorney*—Karl F. Jorda, Martin J. Spellman, Jr. and Bruce M. Collins

[57] ABSTRACT

Derivatives of malonic acid substituted with groups containing a hindered phenol are disclosed. A preferred compound is di-n-octadecyl-2,2-bis-(3',5'-di-t-butyl-4'-hydroxybenzyl) malonate. The compounds are stabilizers suitable for stabilizing numerous substrates of organic material subject to oxidative deterioration, in particular polypropylene. Synergistic combinations of these compounds and dialkyl thiodipropionates are disclosed.

12 Claims, No Drawings

ESTERS OF (DIALKYL-4-HYDROXY-PHENYL)MALONIC ACID AND RELATED COMPOUNDS

THE INVENTION

Natural or synthetic resins, such as polypropylene and polyethylene, are often subject to oxidative deterioration. Other unstable organic materials, such as synthetic lubricants, hydrocarbons, natural and synthetic rubbers, oils of animal or vegetable origin, and the like are also unstable to thermal and/or oxidative deterioration. Such materials may also be unstable to ultraviolet and/or visible light.

It is a principle object of the present invention, therefore, to provide new stabilizers for organic material. It is a further object to provide compositions by incorporating in organic material normally subject to deterioration, stabilizing amounts of a stabilizer as herein described. Other objects of the invention will be apparent from what follows hereinafter.

It has been found that the compounds of this invention are effective in various organic materials, normally subject to oxidative deterioration. The stabilizers of the invention comprise substituted derivatives of malonic acid and related compounds of the formula:

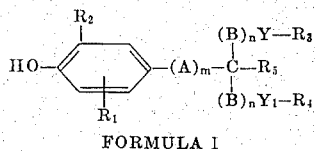

FORMULA I wherein $R_1$ is alkyl of one to 18 carbon atoms; cycloalkyl of five to 12 carbon atoms; alkyl of one to eight carbon atoms is preferred, and most preferable is a tertiary butyl group that is ortho to the hydroxy group;

$R_2$ is hydrogen or alkyl of one to 18 carbon atoms; cycloalkyl of five to 12 carbon atoms; an alkyl of one to eight carbon atoms is preferred; and a tertiary butyl group is most preferable;

$R_3$ and $R_4$ are independently alkyl of one to 40 carbon atoms, alkylthioalkyl, aryl including phenyl and substituted aryl, e.g. alkylaryl; when Y or $Y_1$ is carbonyl, $R_3$ or $R_4$ may also be amino, substituted amino, or thioalkyl respectively; and when Y or $Y_1$ is carboxyl, $R_3$ or $R_4$ may also be hydrogen or an alkali metal respectively; when $m = 0$ and $n = 1$, the combination of Y and $R_3$ and/or $Y_1$ and $R_4$ may then by cyano or cyanoloweralkyl; particularly preferred is alkyl of one to 24 carbon atoms and alkylthioalkyl;

$R_5$ is hydrogen, carbamyl, alkylcarboxyalkyl, cyano and alkyl of one to 22 carbon atoms, or

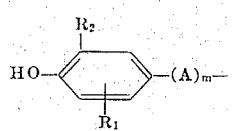

the latter, hydrogen, and alkyl being preferred;

m and n are 0 or 1;

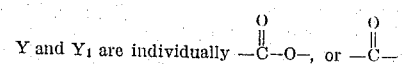

A is alkylene, straight and branched chain of one to 12 carbon atoms, preferably one to six carbon atoms, and most preferably methylene; and B is lower alkylene, i.e. one to six carbon atoms straight or branched chain.

It is understood that in this application and the appended claims the term "alkyl" contemplates both branched and straight chain. Representative of such alkyl groups are thus methyl, ethyl, propyl, i-propyl, n-butyl, s-butyl, t-butyl, octyl, decyl, dodecyl, tetradecyl, octadecyl, and the like.

As previously stated, the compounds of the present invention are useful in the stabilization of organic material normally subject to deterioration. The efficacy of these compounds is evident for example from the greatly increased stability of polymeric material containing a compound of this invention when subjected to oxidative deterioration. In this specification it is understood that polymeric material includes both homopolymeric and copolymeric, such as vinyl resins formed from the polymerization of vinyl halides or from the copolymerization of vinyl halides with unsaturated polymerizable compounds, e.g., vinyl esters, $\alpha,\beta$-unsaturated acids, $\alpha,\beta$-unsaturated esters, $\alpha,\beta$-unsaturated ketones, $\alpha,\beta$-unsaturated aldehydes and unsaturated hydrocarbons such as butadiene and styrene; poly-$\alpha$-olefins such as polymethylene, polyethylene, polypropylene, polybutylene, poly-4-methyl pentene-1, polyisoprene and the like, including copolymers of poly-$\alpha$-olefins; polyurethanes such as are prepared from polyols and organic polyisocyanates; polyamides, such as polyhexamethylene adipamide; polyesters such as polymethylene terephthalates; polymethylmethacrylate; polycarbonates; polyacetals; polystyrene; polyphenylene oxide; polyethyleneoxide; polyacrylics such as polyacrylonitrile; and the like, including mixtures of the forgoing such as those of high impact polystyrene containing copolymers of butadiene and styrene and those formed by the copolymerization of acrylonitrile, butadiene and/or styrene. The preferred polymeric material for stabilization is polypropylene.

Polymeric materials, such as the foregoing, find use as thermoplastic molding or coating agents. Moreover, because of their high dielectric strength and its resistance to water, such materials are particularly useful as insulators or dielectrics in condensers and similar equipment. It is known that these polyolefins, such as polyethylene and polypropylene, are attacked by oxygen, particularly when exposed to the atmosphere and at elevated temperatures. During use or manufacture, for example, the desirable properties of the polyolefins are often impaired by oxidative deterioration. Such degradation causes loss in dielectric properties, discoloration, embrittlement, gelation, and the like. In addition to overcoming these difficulties, the compositions of this invention are also stabilized against degradation caused by heat and light.

The compounds of this invention are also particularly useful in stabilizing lubricating oils of various types including aliphatic esters, polyalkylene oxides, silicones, esters of phosphoric and silicic acids, highly fluorine-substituted hydrocarbons, and the like. Specifically, such aliphatic esters which are usefully stabilized comprise dihexyl azelate, di-(2-ethylhexyl) azelate, di-(3,5,5-trimethylhexyl) glutarate, di-(3,5,5-trimethylpentyl) glutarate, di-(2-ethylhexyl) pimelate, di-(2-ethylhexyl) adipate, diisoamyl adipate, triamyl tricarballylate, pentaerythritol tetracaproate, dipropylene glycol dipelargonate, 1,5-pentanediol di-(2-ethylhexanoate), and the like. Other specific lubricants include polyisopropylene oxide, polyisopropylene oxide diether, polyisopropylene oxide diester, and the like, as well as methyl silicone, methylphenyl silicone, tetraisoctyl silicate, etc. and fluorinated oils, such as perfluorohydrocarbons.

The present invention also relates to the stabilization of fatty materials, including oils of animal or vegetable origin, which tend to deteriorate on standing or exposure to atmospheric oxygen. Also within the scope of the invention are saturated and unsaturated hydrocarbons which tend to deteriorate on storage and use, such as for example, gasolines, jet fuels, diesel oils, mineral oils, and the like. Such hydrocarbons are protected against gum formation, discoloration and other deterioration with the stabilizers of the present invention. Greases and cutting oils may also be stabilized in the same fashion.

These compounds are especially useful in stabilizing polyolefinic material, particularly polypropylene. Fatty acids, such as stearic acid, resins such as acrylonitrile-butadiene-styrene (ABS) terpolymers and polyphenylene oxide, cyclohexene and synthetic oils, such as trimethylolpropane esters of acetic acid, n-valeric acid, hexanoic acid, caprylic acid, pelargonic acid, 2-ethylhexanoic acid, 2-ethylpropanoic acid, and 2-methylpentanoic acid, and mixtures thereof are also very effectively stabilized with the foregoing stabilizers.

The stabilizers of this invention are also useful in stabilizing rubber, e.g. artificial and natural rubber. Other examples of rubber which may be stabilized according to the invention include polybutadiene rubber, polyisoprene rubber, styrene-butadiene rubber, butyl rubber, nitrile rubber, neoprene rubber and blends of artificial rubber with natural rubber, such as for example natural rubber with polybutadiene rubber. Broadly contemplated is the stabilization of any rubber normally subject to degradation.

Particularly preferred stabilizers of the invention are diethyl-2,2-bis-(3',5'-di-t-butyl-4'-hydroxybenzyl)malonate; dimethyl-2,2-bis-(3',5'-di-t-butyl-4'-hydroxybenzyl)malonate; di-n-octadecyl-2,2-bis-(3',5'-di-t-butyl-4'-hydroxybenzyl)malonate; ethyl-2,2-bis-(3',5'-di-t-butyl-4'hydroxybenzyl)acetoacetate; 3,3-bis-(3',5'-di-t-butyl-4'-hydroxybenzyl)pentanedione; and di-n-octadecyl-2-(3',5'-di-t-butyl-4'-hydroxybenzyl)malonate.

In general, stabilizers of the invention are employed in a concentration of from about 0.001 percent to about 10 percent by weight, preferably from about 0.1 percent to about 1 percent by weight. The specific concentration employed varies with the unstabilized material and the specific stabilizer. When mixtures of two or more stabilizers are employed in an unstable material, usually the total amount of added stabilizer does not exceed 10 percent of the total stabilized material.

The stabilizer compounds of this invention may be used also to stabilize organic material in combination with other additive agents, such as e.g. antioxidants, antiozonants, pourpoint depressants, corrosion and rust inhibitors, dispersing agents, chelating agents, surface active agents, demulsifiers, anti-foaming agents, carbon black, accelerators, plasticizers, color stabilizers, heat stabilizers, ultraviolet absorbers, dyes and pigments, fillers, etc.

Merely by way of illustration, the following reaction schemes may be employed in preparing the compounds of this invention. Alternative methods will be readily apparent to those skilled in the art.

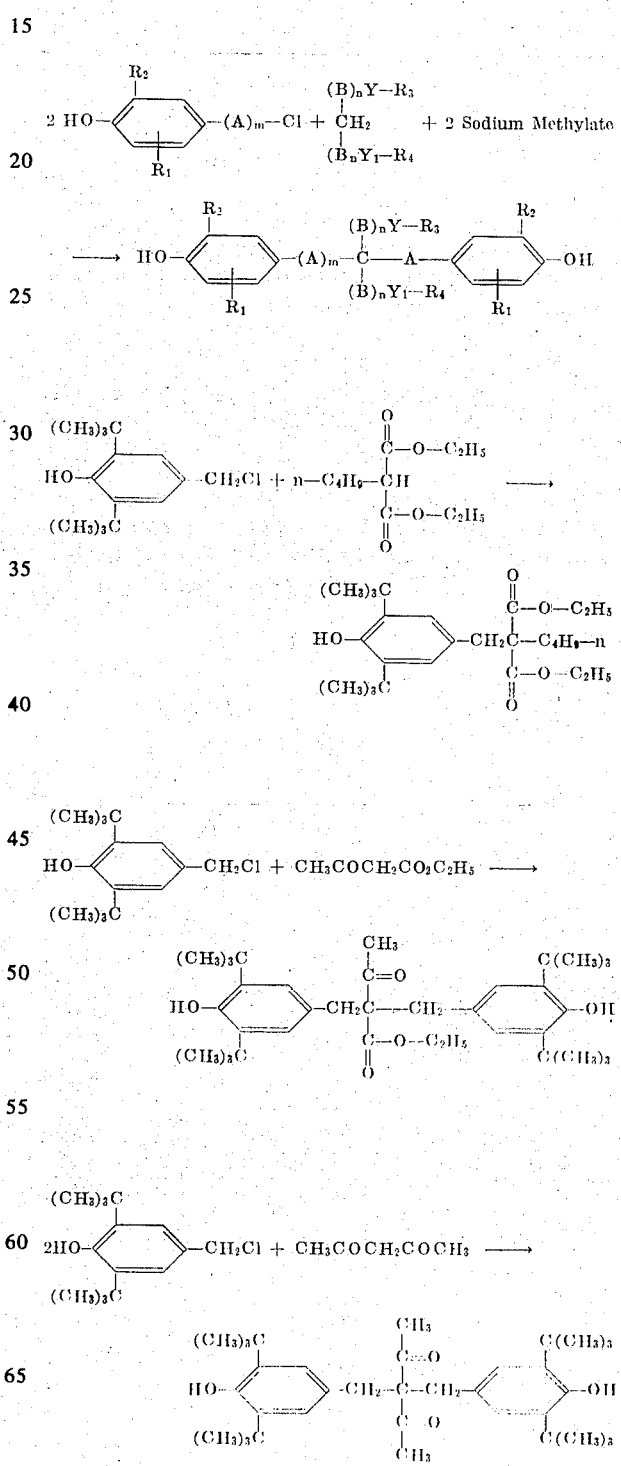

The starting materials for making the compounds of the present invention are available commercially and/or may readily be prepared by those skilled in the art from the teachings of the prior art.

As mentioned, the stabilizers employed in this invention may be used alone or in combination with other stabilizers or additive materials. Especially useful in certain cases is the stabilizer di-lauryl-beta-thiodipropionate. Special mention also is made of di-stearyl-beta-thiodipropionate.

Broadly, compounds of the formula:

$$\begin{array}{c} O \\ \parallel \\ R-O-C-C_xH_{2x} \\ | \\ S \\ | \\ R-O-C-C_xH_{2x} \\ \parallel \\ O \end{array}$$

wherein
R is an alkyl group having from six to 24 carbon atoms
and
x is an integer from 1 to 6, are useful stabilizers in combination with the compounds of the FORMULA I of the invention.

In this specification the term "stabilization" includes protection not merely against oxidative deterioration but also protection against deterioration caused by thermal effects, visible and/or ultraviolet radiation, etc. Thus the stabilizers of the invention are contemplated as acting to protect unstable materials not only against oxidative deterioration but also against other types of deterioration such as thermal degradation or degradation caused by visible and/or ultraviolet light, particle radiation, etc.

The compositions are prepared by a number of means, depending on the substrate. For example, the instant stabilizers can be mixed into liquid substrates and can be milled into thermoplastic substrates. For addition to varnishes, the stabilizer can be dissolved in a co-solvent and this added to the varnish. As mentioned hereinbefore and exemplified hereinafter, levels of the stabilizers in the substrate may vary considerably depending on the particular end application, degree of protection desired, variations in the substrate, and presence of synergizing stabilizers (ultraviolet absorbers, dialkyl thiodipropionates, and the like).

Selecting the proper use level is well within the capabilities of those skilled in the art.

Addition of the instant stabilizers imparts little or no color to most substrates and, after formulation, they are characterized by substantial ability to retain good color under processing conditions and weathering.

The instant invention provides polyolefin compositions protected against thermal and oxidative degradation during processing. It provides minimized melt-flow drift, and extends the service life of finished articles. Particularly noteworthy are the instant compositions' excellent color retention under prolonged heat or light exposure, and their resistance to extraction by boiling water and alkaline detergents.

The following examples describing certain representative embodiments of this invention will serve to further illustrate the nature of the invention. It is to be understood that the examples are merely illustrative and intended to enable those skilled in the art to practice the invention in all of the embodiments flowing therefrom and do not in anyway limit the scope of the invention defined in the claims.

In the examples, parts are by weight unless otherwise indicated and the relationship between parts by weight and parts by volume is as that between grams and cubic centimeters.

EXAMPLE 1

Diethyl-2,2-bis-(3',5'-di-t-butyl-4'-hydroxybenzyl) Malonate 1.9 Parts of sodium (0.08 moles) are dissolved in 100 parts by volume of ethanol at 25 – 50°C, cooled to room temperature and 5.8 parts of diethyl malonate added to the alcoholic solution at room temperature, the colorless solution becoming yellow. 23.0 Parts of 3,5-di-t-butyl-4-hydroxybenzyl chloride (87 percent, 0.08 moles) are added dropwise to the above solution over a period of 30 to 35 minutes at 10 – 12°C. The solution is then allowed to warm to 50°C over a period of 2 hours. The reaction product is then diluted with 300 parts of water and extracted with two 100 parts by volume portions of ether and the separated ether extract dried over anhydrous sodium sulfate. The ether is removed by distillation at 20 mm. Hg. pressure and the residue (24 parts) triturated twice with 50 parts by volume of petroleum ether yielding 14 parts of white crystals melting at 160 – 162°C. On recrystallization from a solvent mixture of 100 parts by volume of hexane and about 5 parts of benzene, the diethyl-2,2-bis-(3',5'5'-di-t-butyl-4'-hydroxybenzyl)malonate melts at 160 – 162°C.

Analysis:
Calculated for $C_{37}H_{56}O_6$ — Mol. Wt. 548.82

|  | C | H |
|---|---|---|
|  | 74.46% | 9.46% |
| Found: | 74.26% | 9.51% |

Dimethyl-2,2-bis-(3',5'-di-t-butyl-4'-hydroxybenzyl)malonate (M.P. 167 – 169°C) is made by the method of Example 1 by reacting dimethyl malonate and 3,5-di-t-butyl-4-hydroxybenzyl chloride in methanol solution.

EXAMPLE 2

Di-n-Octadecyl-2,2-bis-(3',5'-di-t-butyl-4'-hydroxybenzyl) Malonate 5.5 Parts of diethyl-2,2bis-(3',5'-di-t-butyl-4'-hydroxybenzyl) malonate (0.01 moles) and 5.40 parts of n-octadecanol (0.02 moles) are dissolved in 100 parts by volume of toluene. 0.100 Parts of sodium methylate is dispersed in the above solution and 46.4 parts of the solvent slowly distilled over a period of one hour. The reaction mixture is then cooled to room temperature and neutralized with acetic acid, the color changing from reddish brown to yellow. About 100 parts by volume of ether is added, the solution being washed with 5 percent aqueous hydrochloric acid. The solvent is stripped by distillation at 20 mm. Hg. pressure. The residue (10 parts) is recrystallized three times from isopropanol. Di-n-octadecyl-2,2-bis-(3',5'-di-t-butyl-4'-hydroxybenzyl) malonate is then obtained as white crystals melting at 98 – 100°C.

Analysis:
Calculated for $C_{69}H_{120}O_6$ — Mol. Wt. 1,045.6

|  | C | H |
|---|---|---|
|  | 79.26% | 11.57% |
| Found: | 79.20% | 11.52% |

Recrystallization from acetone raises the melting point to 101 – 102°C.

Di-n-octadecyl-2,2-bis-(3',5'-di-t-butyl-4'-hydroxybenzyl) malonate may also be obtained by the method of Example 1 by reacting di-n-octadecyl malonate (M.P. 63 – 64°C) in toluene solution with 3,5-di-t-butyl-4-hydroxybenzyl chloride.

Di-n-octadecyl-2,2-bis-(3',5'-di-t-butyl-4'-hydroxybenzyl) malonate is also prepared by the method of Example 2 by reacting dimethyl-2,2-bis-(3',5'-di-t-butyl-4'-hydroxybenzyl) malonate with n-octadecanol in toluene solution.

EXAMPLE 3

Diethyl-2-Butyl-2-(3',5'-di-t-butyl-4'-hydroxybenzyl) Malonate 2.3 Parts of sodium is dissolved in 150 parts by volume of ethanol by heating at reflux. 21.6 Parts of diethyl butylmalonate (0.10 moles) is added to the sodium ethylate solution at 25°C, followed by the dropwise addition over a period of 25 minutes of a heptane solution of 3,5-di-t-butyl-4-hydroxybenzyl chloride (36.1 parts, 70.5 percent, 0.10 moles) at 10 – 12°C. The reaction mixture is stirred for two hours at room temperature and made acid by the addition of about 5 parts of glacial acetic acid. The reaction mixture is diluted with 300 parts of water and extracted with three 100 parts by volume portions of ether. The separated organic phase is dried over anhydrous sulfate and the solvent stripped at 15 to 20 mm. Hg. pressure. The crude product (43 parts) is crystallized three times with petroleum ether (30 – 60°C) yielding diethyl-2-butyl-2-

(3',5'-di-t-butyl-4'-hydroxybenzyl) malonate in the form of white crystals melting at 70 – 71°C.
Analysis:
Calculated for $C_{28}H_{42}O_5$ — Mol. Wt. 434.6

|  | C | H |
|---|---|---|
|  | 71.86% | 9.74% |
| Found: | 72.09% | 9.75% |

EXAMPLE 4

Ethyl-2,2-bis-(3',5'-di-t-butyl-4'-hydroxybenzyl) Acetoacetate 5.1 Parts of sodium (0.22 moles) are dissolved in 100 parts of ethanol by heating, finally at reflux temperature until dissolved. The sodium ethylate solution is cooled to 15°C and 13.0 parts of ethyl acetoacetate (0.10 moles) are added. A heptane solution of 3,5-di-t-butyl-4-hydroxybenzyl chloride (83 parts, 61.1 percent, 0.20 moles) is added dropwise to the alcoholic solution over a period of 37 minutes at 9 to 12°C., the resulting reaction mixture being stirred for 1 hour at room temperature, followed by 1 hour at 50 – 55°C. 300 Parts by volume of benzene is added to the reaction mixture, the resulting solution being washed with 2 200-part portions of water. The solvents are then removed by distillations at 20 mm. Hg. pressure to yield 56 parts of crude product. Ethyl-2,2-bis-(3',5'-di-t-butyl-4'-hydroxybenzyl) acetoacetate is obtained as white crystals melting at 135 – 137°C after recrystallization from hexane.
Analysis:
Calculated for $C_{36}H_{54}O_5$ — Mol. Wt. 556.8

|  | C | H |
|---|---|---|
|  | 76.28% | 9.60% |
| Found: | 76.47% | 9.74% |

EXAMPLE 5

3,3-Bis-(3',5'-di-t-butyl-4'-hydroxybenzyl)-2,4-pentanedione 5.1 Parts of sodium (0.22 moles) is dissolved in 100 parts of methanol by heating, finally at reflux temperatures until dissolved. The sodium methylate solution is cooled to 15°C and 10.0 parts of 2,4-pentanedione (0.10 moles) added. A heptane solution of 3,5-di-t-butyl-4-hydroxybenzyl chloride (83 parts, 61.1 percent, 0.20 moles) is added dropwise to the methanolic solution over a period of 45 minutes at 10 – 15°C, the resulting reaction mixture being stirred at room temperature for 2 hours, and at 45 – 50°C for 1 hour. The reaction mixture is made acid with about 5 parts of glacial acetic acid, and the solvents removed by distillation at 20 mm. Hg. pressure. The residue is triturated with 200 parts by volume of hexane, washed with hot water and dried in the vacuum oven at 100 mm. Hg. pressure at 70°C for 16 hours. 3,3-bis-(3',5'-di-t-butyl-4'-hydroxybenzyl)- 2,4-pentanedione is obtained in the form of white crystals melting at 155°C after two crystallizations from isopropanol.
Analysis:
Calculated for $C_{35}H_{52}O_4$: Mol. Wt. 136.7

|  | C | H |
|---|---|---|
|  | 78.31% | 9.77% |
| Found: | 78.06% | 9.79% |

EXAMPLE 6

4-(3',5'-di-t-butyl-4'-hydroxyphenyl)-4-Cyanopimelonitrile 24.5 Parts of 3',5'-di-t-butyl-4'-hydroxybenzyl cyanide (0.10 moles) is dissolved at 40°C in 150 parts of t-butanol containing 3.36 parts (0.03 moles) of potassium-t-butoxide to give a clear green solution. 10.6 Parts of acrylonitrile is then added dropwise over a period of 15 minutes and the reaction mixture heated at reflux for 5 hours during which time the color changes to yellowish brown. The reaction mixture is cooled to 30°C. 100 Parts of 10 percent acetic acid is added and the reaction mixture cooled to 10°C. The precipitated crystals are filtered, washed with water and dried. The crystals melt at 124 – 126°C. Recrystallization from a solvent mixture of 75:25 t-butanol-isopropanol yields white crystals melting at 124 – 126°C.
Analysis:
Calculated for $C_{22}H_{29}ON_3$

|  | C | H | N |
|---|---|---|---|
|  | 75.17% | 8.31% | 11.95% |
| Found: | 75.57% | 7.98% | 12.20% |

If acrylamide is substituted for acrylonitrile in the above example, then 4-(3',5'-di-t-butyl-4'-hydroxyphenyl)-4-cyano-1,7-heptanedioic acid amide is obtained.

If octadecyl acrylate is substituted for acrylonitrile in the above example, then di-n-octadecyl-4-(3',5'-di-t-butyl-4'-hydroxyphenyl)-4-cyanopimelate, having a melting point of 70 – 72° C., is obtained.

EXAMPLE 7

Dimethyl 4-(3',5'-di-t-butyl-4'-hydroxyphenyl)-4-Cyanopimelate 17.5 Parts of 4-(3',5'-di-t-butyl-4'-hydroxyphenyl)-4-cyanopimelonitrile is dissolved in 100 parts of methanol and then cooled to −10°C, the fine suspension being saturated with gaseous hydrogen chloride at −5° to 0°C over a period of 40 minutes. The reaction mixture is then stirred and heated at reflux for 30 minutes. The resultant crystal slurry is then poured onto 500 parts of ice. After the ice has melted the crystals are filtered, washed with water, then redispersed in water and heated on the steam bath for 1½ hours. The dispersion is then cooled, the precipitate being filtered and taken up in ether. The ether solution is then washed with sodium bicarbonate and dried over sodium sulfate. The ether solution is concentrated in vacuum to yield the product as a crystalline residue. The residue is then recrystallized from n-hexane yielding white crystals melting at 110 – 112°C.
Analysis:
Calculated for $C_{24}H_{35}O_5N$

|  | C | H | N |
|---|---|---|---|
|  | 69.03% | 8.44% | 3.35% |
| Found: | 69.14% | 8.45% | 3.33% |

EXAMPLE 8

Di-2''-Octylthioethyl-2,2-Bis-(3',5'-di-t-butyl-4'-hydroxybenzyl) Malonate

Following a procedure analogous to that of Example 2, except that an equivalent quantity of 2-octylthioethanol is employed instead of octadecanol, di-2''-oclylthioethyl-2,2-bis-(3',5'-di-t-butyl-4'-hydroxybenzyl) malonate is obtained having a melting point of 98°C. EXAMPLE 10

Di-n-Octyl-2,2-Bis-(3'''-di-t-butyl-4'-hydroxybenzyl) Malonate

EXAMPLE 9

Di-2'''-Ethylhexyl-2,2-Bis-(3',5'-di-t-butyl-4'-hydroxybenzyl) Malonate

Following a procedure analogous to that of Example 2, except that an equivalent quantity of 2-ethylhexanol is employed instead of octadecanol, di-2'''-ethylhexyl-2,2-bis-(3',5'-di-t-butyl-4'-hydroxybenzyl) malonate is obtained having a melting point of 80°C.

EXAMPLE 10

Di-n-Octyl-2,2-Bis-(3',5'-di-t-butyl-4'-hydroxybenzyl) Malonate

Following a procedure analogous to that of Example 2, except that an equivalent quantity of n-octanol is employed instead of octadecanol, di-n-octyl-2,2-bis-(3',5'-di-t-butyl-4'-hydroxybenzyl) malonate is obtained having a melting point of 109°C.

EXAMPLE 11

Di-n-Dodecyl-2,2-Bis-(3',5'-di-t-butyl-4'-hydroxybenzyl) Malonate

Following a procedure analogous to that of Example 2, except that an equivalent quantity of dodecanol is employed instead of octadecanol, di-n-dodecyl-2,2-bis-(3',5'-di-t-butyl-4'-hydroxybenzyl) malonate is obtained having a melting point of 110°C.

EXAMPLE 12

The procedure of Example 1 is repeated substituting stoichiometrically equivalent quantities of appropriately substituted starting materials and the following diethyl malonates are obtained:

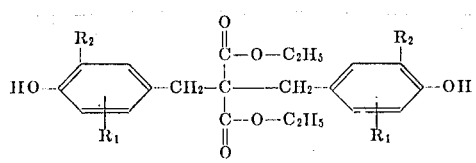

| Compound | $R_2$ | $R_1$ |
|---|---|---|
| A | $CH_3$ | 5-$CH_3$ |
| B | H | 5-t-$C_4H_9$ |
| C | t-$C_4H_9$ | 5-$CH_3$ |
| D | i-$C_3H_7$ | 5-i-$C_3H_7$ |
| E | s-$C_4H_9$ | 5-s-$C_4H_9$ |
| F | n-$C_4H_9$ | 5-n-$C_4H_9$ |
| G | t-$C_4H_9$ | 5-i-$C_8H_{17}$ |
| H | $C_8H_{17}$ | 5-$C_8H_{17}$ |
| I | t-$C_4H_9$ | 6-$CH_3$ |
| J | cyclohexyl | 5-$CH_3$ |
| K | t-$C_4H_9$ | 5-$C_{18}H_{37}$ |
| L | $C_{18}H_{37}$ | 5-$C_{18}H_{37}$ |
| M | $CH_3$ | 5-$CH_3$ |
| N | t-$C_4H_9$ | 5-$CH_3$ |
| O | i-$C_3H_7$ | 5-i-$C_3H_7$ |
| P | s-$C_4H_9$ | 5-s-$C_4H_9$ |
| Q | n-$C_4H_9$ | 5-n-$C_4H_9$ |
| R | t-$C_4H_9$ | 5-i-$C_8H_{17}$ |
| S | $C_8H_{17}$ | 5-$C_8H_{17}$ |
| T | t-$C_4H_9$ | 6-$CH_3$ |
| U | t-$C_4H_9$ | 5-$C_{18}H_{37}$ |
| V | cyclohexyl | 5-cyclohexyl |
| W | cyclododecyl | 6-methyl |

EXAMPLE 13

Diethyl-2,2-Bis-[3'-(3'',5''-di-t-butyl-4''-hydroxphenyl)propyl] Malonate

The procedure of Example 1 is repeated but an equivalent quantity of 3-(3',5'-di-t-butyl-4'-hydroxyphenyl)propyl chloride was employed instead of the 3,5-di-t-butyl-4-hydroxybenzyl chloride. The compound diethyl-2,2-bis-[3'-(3'',5''-di-t-butyl-4''-hydroxyphenyl) propyl] malonate is obtained.

EXAMPLE 14

Diethyl-2,2-Bis-[6'-(3'',5''-di-t-butyl-4''-hydroxphenyl)hexyl] Malonate

The procedure of Example 1 is repeated but an equivalent quantity of 6-(3',5'-di-t-butyl-4'-hydroxyphenyl) hexyl chloride was employed instead of the 3,5-di-t-butyl-4-hydroxybenzylchloride. The compound diethyl-2,2-bis-[6'-(3'',5''-di-t-butyl-4''-hydroxyphenyl) hexyl] Malonate is obtained.

EXAMPLE 15

Di-Phenyl-2,2-Bis-(3',5'-di-t-butyl-4'-hydroxybenzyl) Malonate

Following a procedure analogous to that of Example 1, except that an equivalent quantity of diphenyl malonate is employed instead of diethyl malonate, di-phenyl-2,2-bis-(3',5'-di-t-butyl-4'-hydroxybenzyl) malonate is obtained.

EXAMPLE 16

Di-3''-Methylphenyl-2,2-Bis-(3',5'-di-t-butyl-4'-hydroxybenzyl) Malonate

Following a procedure analogous to that of Example 1, except that an equivalent quantity of di-m-methylphenyl malonate is employed instead of diethyl malonate, di-3''-methylphenyl-2,2-bis-(3',5'-di-t-butyl-4'-hydroxybenzyl) malonate is obtained.

EXAMPLE 17

Stabilization of Polypropylene

Unstabilized polypropylene powder (Profax 6501) is thoroughly blended with 0.5 percent by weight of di-n-octadecyl-2,2-bis-(3',5'-di-t-butyl-4'-hydroxybenzyl) malonate. The blended material is then milled on a two roller mill at 182° for 5 minutes, after which time the stabilized polypropylene is sheeted from the mill and allowed to cool.

The milled polypropylene sheet is then cut into small pieces and pressed for 7 minutes on a hydraulic press at 218° and 2,000 pounds per square inch pressure. The resultant sheet of 25 mil thickness is then tested for resistance to accelerated aging in a forced draft oven at 149°. The resultant composition of 0.5 percent by weight of di-n-octadecyl-2,2-bis-(3',5'-di-t-butyl-4'-hydroxybenzyl) malonate and polypropylene is stabilized against oxidative deterioration for over 600 hours. The unstabilized polypropylene deteriorates after only 3 hours.

In like manner as the foregoing, stable compositions of polypropylene are prepared having 0.5 percent by weight of the following compounds:
Diethyl-2,2-bis-(3',5'-di-t-butyl-4'-hydroxybenzyl) malonate, stabilized for 155 hours;
Dimethyl-2,2-bis-(3',5'-di-t-butyl-4'-hydroxybenzyl) malonate, stabilized for 65 hours, and
Ethyl-2,2-bis-(3',5'-di-t-butyl-4'-hydroxybenzyl) acetoacetate, stabilized for 85 hours.

The same procedure was repeated, except that 0.1 percent of stabilizer compound and 0.5 percent of dilauryl-β-thiodipropionate (DLTDP) was incorporated into the polypropylene. The resultant compositions were stabilized as indicated.

| Compositions of Polypropylene, DLTDP, and | Hours to Failure |
|---|---|
| Diethyl-2,2-Bis-(3',5'-di-t-butyl-4'-hydroxybenzyl) malonate | 450 |
| Dimethyl-2,2-Bis-(3',5'-di-t-butyl-4'-hydroxybenzyl) malonate | 385 |
| Di-n-octadecyl-2,2-Bis-(3',5'-di-t-butyl-4'-hydroxybenzyl) malonate | 1050 |
| Diethyl-2-Butyl-2-(3',5'-di-t-butyl-4'-hydroxybenzyl) malonate | 405 |
| Ethyl-2,2-Bis-(3',5'-di-t-butyl-4'-hydroxybenzyl) acetoacetate | 390 |
| 3,3-Bis-(3',5'-di-t-butyl-4'-hydroxybenzyl)-2,4-pentanedione | 425 |
| Di-n-Octadecyl 4-(3',5'-di-t-butyl-4'-hydroxyphenyl)-4-cyanopimelate | 710 |

EXAMPLE 18

The same procedure of Example 17 was repeated, except that Montecatini MOPLEN AD 10 polypropylene was used, and the test sheet of polypropylene was 1 mm. thick. Stable compositions containing the percentages of stabilizer compound alone and with DLTDP were stabilized as follows:

| Compound | % | DLTDP % | Days to Failure |
|---|---|---|---|
| Di-2'''-Octylthioethyl-2,2-Bis-(3',5'-di-t-butyl-4'-hydroxyphenyl) malonate | 0.1 | 0.3 | 37 |
| Do | 0.2 | 0.0 | 36 |
| Do | 0.5 | 0.0 | 73 |
| Di-2'''-Ethylhexyl-2,2-Bis-(3',5'-di-t-butyl-4'-hydroxyphenyl) malonate | 0.1 | 0.3 | 34 |
| Do | 0.2 | 0.0 | 17 |
| Do | 0.5 | 0.0 | 28 |
| Di-Octyl-2,2-Bis-(3',5'-di-t-butyl-4'-hydroxyphenyl) malonate | 0.1 | 0.3 | 34 |
| Do | 0.2 | 0.0 | 26 |
| Do | 0.5 | 0.0 | 39 |
| Di-n-Dodecyl-2,2-Bis-(3',5'-di-t-butyl-4'-hydroxyphenyl) malonate | 0.1 | 0.3 | 42 |
| Do | 0.2 | 0.0 | 31 |
| Do | 0.5 | 0.0 | 40 |

EXAMPLE 19

STABILIZATION OF MINERAL OIL

A water-white, refined (U.S.P. grade) mineral oil (Esso PRIMOL D) is stabilized under the following test conditions.

A sample of mineral oil (10 parts) is placed in a Sligh-type oxidation flask filled with oxygen at room temperature (25°) and atmospheric pressure. Thereafter, the flask is sealed to form a system having a mercury manometer which measures the pressure changes as oxygen is absorbed by the sample in the flask. The sample is then heated at 150° until the manometer registers a decrease of 300 mm Hg pressure within the flask with reference to the maximum pressure obtained at 150°. The stabilized mineral oil contains 0.1 percent by weight of di-n-octadecyl-2,2-bis-(3',5'-di-t-butyl-4'-hydroxybenzyl) malonate.

EXAMPLE 20

STABILIZATION OF A RESIN CONTAINING ELASTOMER

High impact polystyrene resin containing elastomer (i.e., butadiene-styrene) is stabilized against loss of elongation properties by incorporation of 0.5 percent by weight of di-n-octadecyl-2,2-bis-(3',5'-di-t-butyl-4'-hydroxybenzyl) malonate.

The unstabilized resin is dissolved in chloroform and the stabilizer then added, after which the mixture is cast on a glass plate and the solvent evaporated to yield a uniform film which upon drying, is removed and cut up, and then pressed for 7 minutes at a temperature of 163° and a pressure of 2,000 pounds per square inch into a sheet of uniform thickness (25 mil). The sheets are then cut into strips, approximately 4 × 0.5 inches. A portion of these strips is then measured for length of elongation in the Instron Tensile tester (Instron Engineering Corporation, Quincy, Mass.). The remaining portion of the strips is aged in a forced draft oven for 6 weeks at 75° and thereafter tested for elongation.

EXAMPLE 21

STABILIZATION OF ACRYLONITRILE-BUTADIENE-STYRENE POLYMER

A 300 gram sample of acrylonitrile-butadiene-styrene polymer (available under the name of TYBRENE from Dow Chemical Company) is fused on a two roll mill preheated to 400°F. has added to it 1.0 by weight di-n-octadecyl-2,2-bis-(3',5'-di-t-butyl-4'-hydroxybenzyl) malonate, and 1.0 percent calcium stearate lubricant. The fusing of the polymer and addition of additives are completed in approximately 5 minutes. The composition resulting is then milled for an additional 60 minutes. Thereafter 60 gram samples are removed and cut into 4 × 4 × 0.125 inches plaques which were compression molded at 390°F. for 7 minutes at 1,500 p.s.i. and then cooled in a water cooled platen press.

Notched Izod impact strength of the samples are then measured on the TNI Impact Tester to determine change in plastic toughness during aging according to ASTM D 256-56 method. The stabilized polymer retains the desirable properties much longer than the unstabilized polymer.

EXAMPLE 22

STABILIZATION OF CYCLOHEXENE

Di-n-octadecyl-2,2-bis-(3',5'-di-t-butyl-4'-hydroxybenzyl) malonate is dissolved in a small amount of benzene, then is added to freshly distilled cyclohexene to provide a concentration of 0.001 percent. The composition is placed in an oxygen bomb and the bomb is pressured with oxygen to 100 psi at 25°C. The bomb is placed in a water bath at 100°C. When the contents have reached bath temperature, the rate of drop of oxygen pressure is measured. When there is a sudden and abrupt uptake of oxygen, the time is noted and this is taken as a failure end point. The foregoing composition is stabilized, whereas the unstabilized cyclohexene fails after about 30 minutes.

While the invention has been explained by detailed description of certain specific embodiments, it is understood that various modifications and substitutions can be made in any of them within the scope of the appended claims which are intended also to include equivalents of such embodiments.

What is claimed is:

1. A compound of the formula

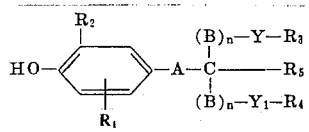

where
R₁ and R₂ are alkyl groups of one to 18 carbon atoms, cycloalkyl groups of five to 12 carbon atoms $$Y \text{ is } -\overset{O}{\underset{\|}{C}}-O- \text{ or } -\overset{O}{\underset{\|}{C}}-$$

$$Y_1 \text{ is } -\overset{O}{\underset{\|}{C}}-O-$$

A is alkylene
B is lower alkylene
n is 0 or 1
R₃ and R₄ are alkyl groups of one to 14 carbon atoms, alkylthioalkyl, H or alkali metal and
R₅ is an alkyl group of one to four carbon atoms or

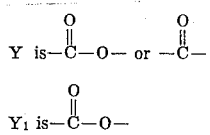

2. A compound as claimed in claim 1 wherein A is alkylene of one to six carbon atoms.

3. A compound as claimed in claim 1 wherein R₁ and R₂ are alkyl or one to eight carbon atoms.

4. A bis(3,5-dialkyl-4-hydroxybenzyl) malonic ester of the formula

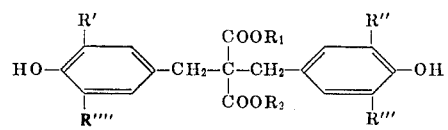

wherein R₁ and R₂ are alkyl radicals having from one to 18 carbon atoms and R', R'', R''', and R'''' are alkyl radicals having from one to nine carbon atoms.

5. A compound as claimed in claim 3 wherein R₅ is alkyl of one to four carbon atoms or

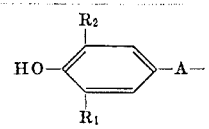

6. A compound as claimed in claim 5 wherein R₁ and R₂ are tertiary butyl.

7. A compound as claimed in claim 5 wherein n is 0; Y and Y₁ are

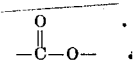

and R₃ and R₄ independently are alkyl of one to 24 carbon atoms and alkylthioalkyl; R₅ is

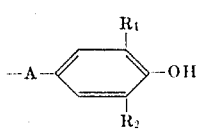

and A is methylene.

8. A compound as claimed in claim 1 which is diethyl-2,2-bis-(3',5'di-t-butyl-4'-hydroxybenzyl) malonate.

9. A compound as claimed in claim 1 which is dimethyl-2,2-bis-(3',5'di-t-butyl-4'-hydroxybenzyl) malonate.

10. A compound as claimed in claim 1 which is di-n-octadecyl-2,2-bis-(3',5'-di-t-butyl-4'-hydroxybenzyl) malonate.

11. A compound as claimed in claim 1 which is diethyl-2-butyl-2,2-bis-(3',5'-di-t-butyl-4'-hydroxybenzyl) malonate.

12. A compound as claimed in claim 1 which is ethyl-2,2-bis-(3',5'-di-t-butyl-4'-hydroxybenzyl) acetoacetate.

* * * * *

UNITED STATES PATENT OFFICE
CERTIFICATE OF CORRECTION

Patent No. 3,721,704    Dated March 20, 1973

Inventor(s) Martin Dexter

It is certified that error appears in the above-identified patent and that said Letters Patent are hereby corrected as shown below:

Title Page, Assignee "Geigy Chemical Corporation" should read -- CIBA-GEIGY Corporation --

Column 4, line 28     Insert -- when n=0 --

Column 11, line 10    "98°C. EXAMPLE 10" should read -- 98°C. --

Column 11, line 11--  should be deleted --

Signed and sealed this 4th day of February 1975.

(SEAL)
Attest:

McCOY M. GIBSON JR.
Attesting Officer

C. MARSHALL DANN
Commissioner of Patents